US010742481B2

(12) United States Patent
Chen et al.

(10) Patent No.: US 10,742,481 B2
(45) Date of Patent: Aug. 11, 2020

(54) NEAR REAL TIME ANALYTICS (71) Applicant: Microsoft Technology Licensing, LLC, Redmond, WA (US)

(72) Inventors: Qi Chen, San Jose, CA (US); Yuriy Grinberg, Moss Beach, CA (US); Richard Mar, Concord, CA (US); Wesley Hargrove, San Francisco, CA (US); Arvind Kalyan, Saratoga, CA (US); Apoorvi Kapoor, Sunnyvale, CA (US); Ajay Subramanian, Campbell, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 16/177,395

(22) Filed: Oct. 31, 2018

(65) Prior Publication Data
US 2020/0136889 A1 Apr. 30, 2020

(51) Int. Cl.
H04L 12/24 (2006.01)
(52) U.S. Cl.
CPC .............. *H04L 41/06* (2013.01); *H04L 41/14* (2013.01); *H04L 41/22* (2013.01)
(58) Field of Classification Search
CPC .......... H04L 41/06; H04L 41/14; H04L 41/22
See application file for complete search history.

(56) References Cited

U.S. PATENT DOCUMENTS

| 2005/0060229 A1* | 3/2005 | Riedl ..................... H04N 21/84 705/14.61 |
| 2011/0191246 A1* | 8/2011 | Brandstetter .......... G06Q 30/02 705/59 |
| 2011/0202562 A1* | 8/2011 | Bloch .................. G06Q 10/101 707/776 |
| 2014/0280896 A1* | 9/2014 | Papakostas ............. H04W 4/50 709/224 |
| 2016/0103757 A1* | 4/2016 | Liu ...................... G06F 11/3082 717/130 |
| 2016/0127440 A1* | 5/2016 | Gordon ................. H04L 65/601 709/219 |
| 2018/0063264 A1* | 3/2018 | Papakostas ........... H04L 43/028 |
| 2018/0350251 A1* | 12/2018 | Baker ...................... G09B 7/00 |

* cited by examiner

*Primary Examiner* — Michael A Keller
(74) *Attorney, Agent, or Firm* — Hickerman Palermo Becker Bingham LLP (57) ABSTRACT

Techniques for performing near real-time analytics are provided. In one technique, different client devices generate different sets of events pertaining to the same or different media item. Events generated by one client device are assigned to one process (or machine) while events generated by another client device are assigned to a different process (or machine). Each process aggregates events assigned to it based on a time window to generate an aggregated event. The aggregated events are stored in persistent storage. In response to a request for a report that is associated with a media item, one or more of the aggregated events are retrieved from persistent storage and report data is generated based on the aggregated events. The report data is sent to the requestor for visual presentation.

17 Claims, 5 Drawing Sheets

NEAR REAL TIME ANALYTICS

TECHNICAL FIELD

The present disclosure relates to utilizing computer components to efficiently analyze and communicate network data activity.

BACKGROUND

Real time analytics pertain to analyzing data as soon as the data enters a computer system. Enterprises have progressively developed various uses for real time analytics in order to perform tasks ranging from detecting trends in online user activity to optimizing daily activities. One form of real time analytics is downloadable reports that give insight on how organizations and individuals utilize applications and services at an administrative and user level. Historically, there has been a significant time delay between when the online activity occurs and when reports that reflect that online activity can be generated, resulting in decreased utility for the entire system, an increase in user dissatisfaction, and possibly errors and inconsistencies in the data reflected in the reports.

There have also been limitations to the accuracy of these reports due to issues such as data lost from online/offline workflow errors, lack of scalability, and inability to correct errors identified in the data. Lack of accuracy within these reports is counterproductive to the initiative to use data analytics for predicting the trends and behavior of network users, and the current process of checking the accuracy of these reports requires a significant amount of manual labor. Thus, there is a need for an implementation of near real time analytics that supports swift activity-to-analysis performance, data inconsistency correction, and efficient report generation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method are provided for near real time analytics. Client devices transmit multiple activity events indicating presentation of various portions of media items provided by a content distribution network. A real-time event processing system associated with the content distribution network repartitions the activity events and aggregates the repartitioned events to generate aggregated events. These aggregated events are stored in persistent storage. Also, an offline event processing system receives and processes the activity events and stores the processed events in the persistent storage. Other client devices, such as those operated by administrators or customers, request reports containing metrics associated with the activity events. In response to receiving a request, a report is generated based on data produced by the real-time event processing system and data produced by the offline event processing system. The report is sent to the requesting client device for presentation through a graphical user interface.

In one embodiment, a system comprises pipelines configured to handle the addition of reports and data associated with activity events, and may generate automated alerts for failures in the system. The data used for the analytics and building of the reports originates from one or more sets of workflows, where a first set of workflows is implemented by online components of the system and a second set of workflows is implemented by offline components of the system, both of which components push data to computing devices and databases. In the event of an error or inconsistency in the sets of workflows, the system comprises a recovery architecture that allows for the correction of errors in the data and a backfill architecture that backfills data for any additional metrics that are supported.

In one embodiment, the data produced by the workflows are used to generate a plurality of metrics associated the activity events. These metrics may be verified by a process that checks for consistency between the online and offline workflows via comparing the outputs from both workflows for synchronization.

The systems and methods described herein provide improvements to data analytics production, correction, and presentation in real time. The systems and methods support scalability of reports and analytics, extensible reporting via the ability to compute additional metrics, faster processing with a relatively short latency period due to the offline and online processing of data, and increased robustness due to both offline and online processing of event data, which ensures that reports are available in case one of the two pipelines fails. Furthermore, the systems and methods support data recovery, data backfilling, and automated testing and verification of data and data reports in a near real-time reporting architecture. Also, the system is able to reduce human error associated with manual testing of analytical data. Thus, the systems and methods described herein improve the functioning of computing systems by enhancing the speed, accuracy, and efficiency of processing and presenting data analytics in real time.

Example System

Figure 1:
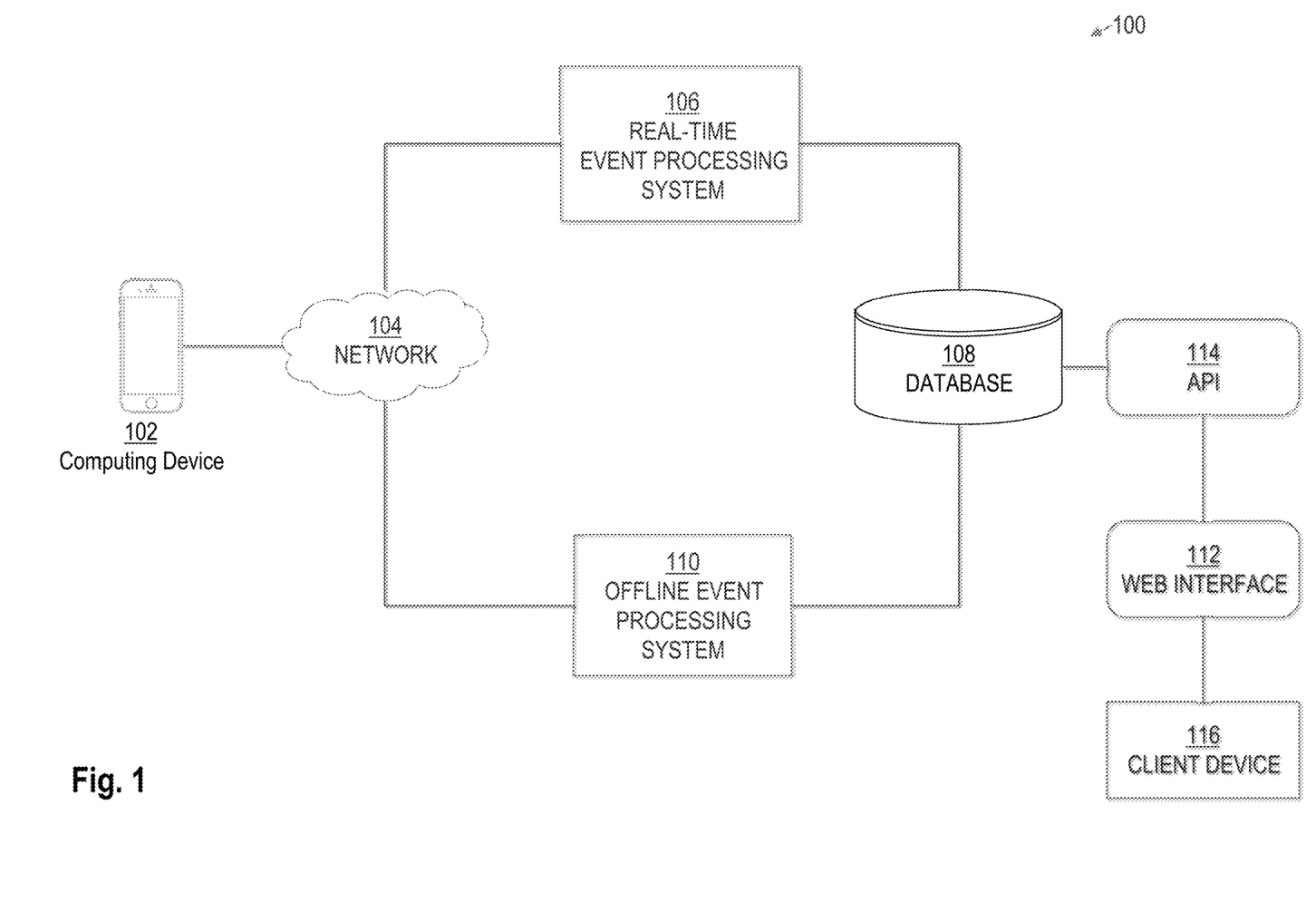
FIG. 1 is an example system in which the techniques described may be practiced according to certain embodiments.

FIG. 1 depicts an example system 100 in which the techniques described may be practiced according to certain embodiments. System 100 is a computer-based system. The various components of system 100 are implemented at least partially by hardware at one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. The descriptions of the components may be converted into software code, including code executable by an electronic processor. System 100 illustrates only one of many possible arrangements of components configured to perform the functionality described herein. Other arrangements may include fewer or different components, and the division of work between the components may vary depending on the arrangement.

FIG. 1 is an example system 100 for near real-time analytics and reporting, in an embodiment. System 100 includes computing device 102 that is communicatively coupled to network 104, which is communicatively coupled to real-time event processing system 106 (which is communicatively coupled to database 108) and offline event processing system 110. In one embodiment, network 104 may be implemented by a network of communicatively coupled computing devices.

Although only a single computing device 102 is depicted, system 100 may include multiple computing devices that transmit activity events over network 104 to event processing systems 106 and 110. Examples of computing device 102 include a laptop computer, a tablet computer, a smartphone, a desktop computer, a Personal Digital Assistant (PDA), and any other mechanism used to access networks or applications. An example of an application that executes on computing device 102 and generates the activity events includes a web application executing within a web browser or a client application (installed on computing device 102) that is configured to communicate with real-time event processing system 106 and/or offline event processing system 110 over network 104.

Real-time event processing system 106 and offline event processing system 110 may be implemented in hardware, software, or a combination of hardware and software. System 100 implements data bus streaming, ETL pipelining, online/offline processing, storage mechanisms, such as Hadoop Distributed File System (HDFS), and other functions that enable system 100 to operate as a multi-layered frontend/backend system. In one embodiment, event processing systems 106 and 110 function as a distributed stream processing framework allowing multiple input streams and producing an output stream for stateless jobs. Event processing systems 106 and 110 may also function as a distributed stream processing framework for stateful jobs containing data that is aggregated and stored internally. Each of event processing systems 106 and 110 implements its own respective workflow(s) based on events associated with user activity and media items.

Each of event processing systems 106 and 110 may include multiple computing devices that implemented processes that process activity events received from remote computing devices (e.g., computing device 102). Different computing devices may execute different jobs that perform different functions, which are described in more detail below.

Database 108 comprises persistent storage. Database 108 may be an online analytical processing (OLAP) database, an example of which is Pinot, a real-time distributed data store. Database 108 ingests data from batch data sources (such as Apache Hadoop and flat files) as well as streaming sources (such as Apache Kafka). Database 108 may be optimized for analytical use cases on immutable append-only data and offers data freshness that is on the order of a few seconds or minutes. Database 108 may be horizontally scalable and may scale to hundreds of tables, machines and thousands of queries per second in production. Example features of database 108 include a column-oriented database with various compression schemes, pluggable indexing technologies (e.g., Sorted Index, Bitmap Index, Inverted Index), an ability to optimize query/execution plan based on query and segment metadata, near real-time ingestion from a real-time event processing system and batch ingestion from an offline event processing system, and SQL-like language that supports selection, aggregation, filtering, group by, order by, distinct queries on fact data. Database 108 may store records by date enabling the ability to reprocess data that is inconsistent within a certain time frame.

Example embodiments of system 100 are configured to function as an event processing system that allows for performance of complex event processing such as identification of significant events and "change of state" when a measurement exceeds a threshold. In an embodiment, event processing software, such as Apache Kafka®, Apache Samza®, Apache Hadoop®, and other software that facilitate real-time data feeds for large amounts of data and computation may be used to implement system 100.

Event Types

Computing device 102 generates one or more types of activity events while processing/presenting a media item. Example types of activity events include a view progress event, a completion event, and a page view event.

A view progress event (VPE) may be generated every N seconds a media item is viewed. For example, if N is 3 and a media item is a 3-minute video, then a client may generate 60 VPEs while presenting the video. Each VPE specifies one or more data items, such as start time, end time, time range within the video, a date of when the VPE occurred, a client indicator (e.g., a device identifier or a browser cookie), a user identifier (ID), a content item ID, and a course ID (if the media item is part of a pre-defined course of multiple (e.g., ordered) media items).

A completion event (CE) may be generated when a media item is "completely" viewed. Completely viewing a media item (e.g., a video) may be defined as viewing the entirety of the media item, at least the majority of the media item, the last 10% of the media item, or some other measure of completeness. A CE may specify one or more of a time/date indicator, a client indicator, a user ID, a media item ID, and a course ID.

A page view event (PVE) may be generated based on information derived from activities occurring during a user login session. For example, a client generates a PVE when a user has logged into the content distribution network and/or requested a particular page from the content distribution network.

Example Report

Figure 2:
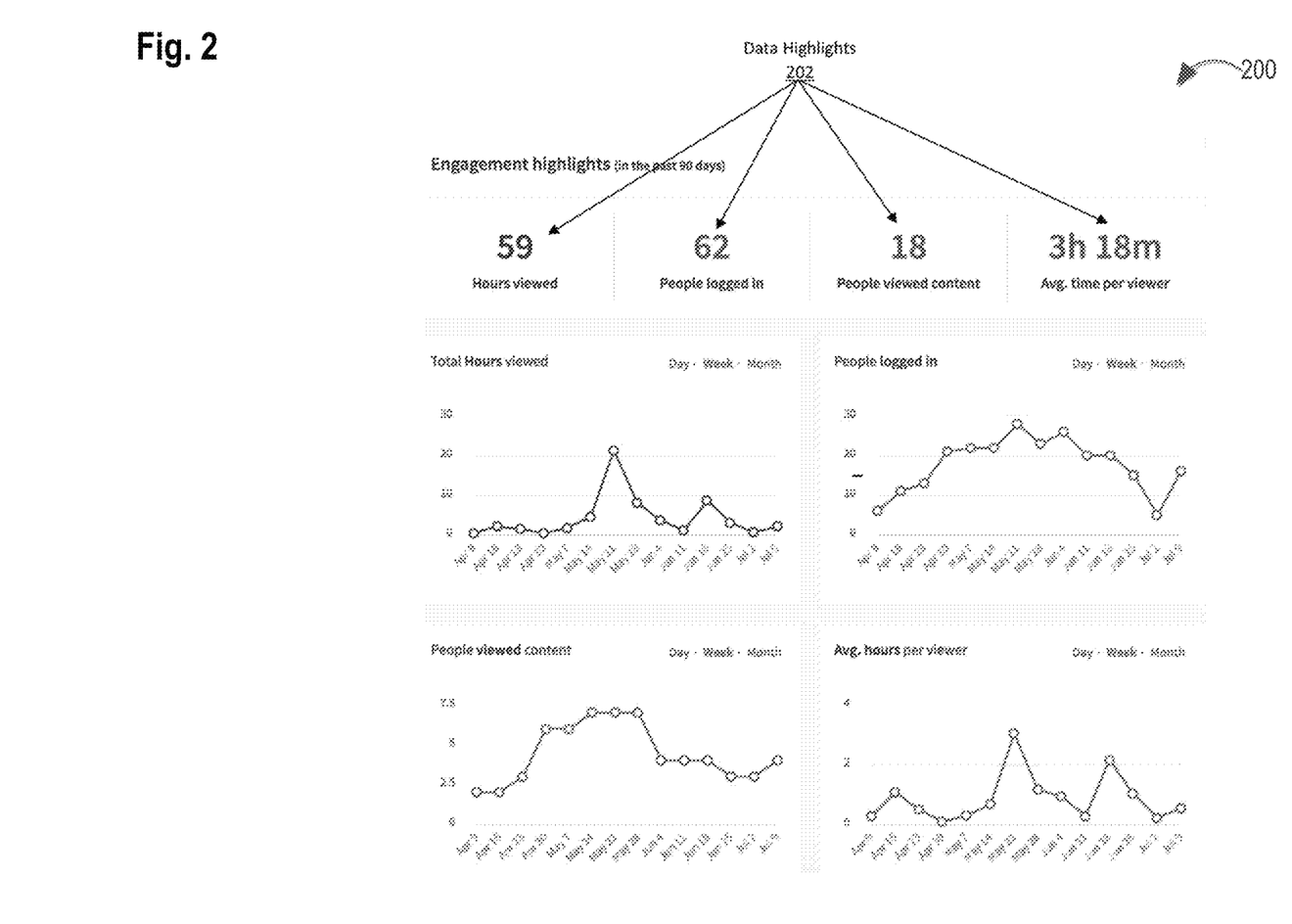
FIG. 2 is a screenshot of an example real-time report generated based on data stored in a database, in an embodiment.

FIG. 2 is a screenshot of an example report 202 generated based on data stored in database 108. Report 200 comprises data highlights 202, which accounts for various noteworthy types of activities of multiple users associated with a particular account. In the depicted example, metrics of the report include number of hours that users or the particular account viewed one or more media items over the last 90 days, the number of (e.g., unique) users logged into a content distribution network over the last 90 days, the number of (e.g., unique) users who viewed content over the last 90 days, and the average time per viewer to which content (e.g., a particular media item or group of media items) was presented over the last 90 days. Report 200 also shows these types of metrics on a weekly basis, with the option to view these types of metrics on a daily basis and a monthly basis.

In one embodiment, report 200 may be based on preferences comprising metrics, bars, graphs, and charts representing information gathered from client devices connected to the content distribution network, and error alerts, red flags, or malfunctions occurring within components of system 100.

Report 200 may be based on a csv file that is generated in response to a request for a report and contains the necessary information needed to visually present the information in a user-friendly way. Report 200 allows an administrator or customer of the particular account to view and verify data analytics of consumption of certain media items by individual users and/or one or more groups of users associated with the particular account. An administrator may manually request an updated version of report 200 that provides up-to-date information and/or a correction for any inconsistencies of analytics between the sets of workflows implemented by event processing systems 106 and 110.

Example Process

Figure 3:
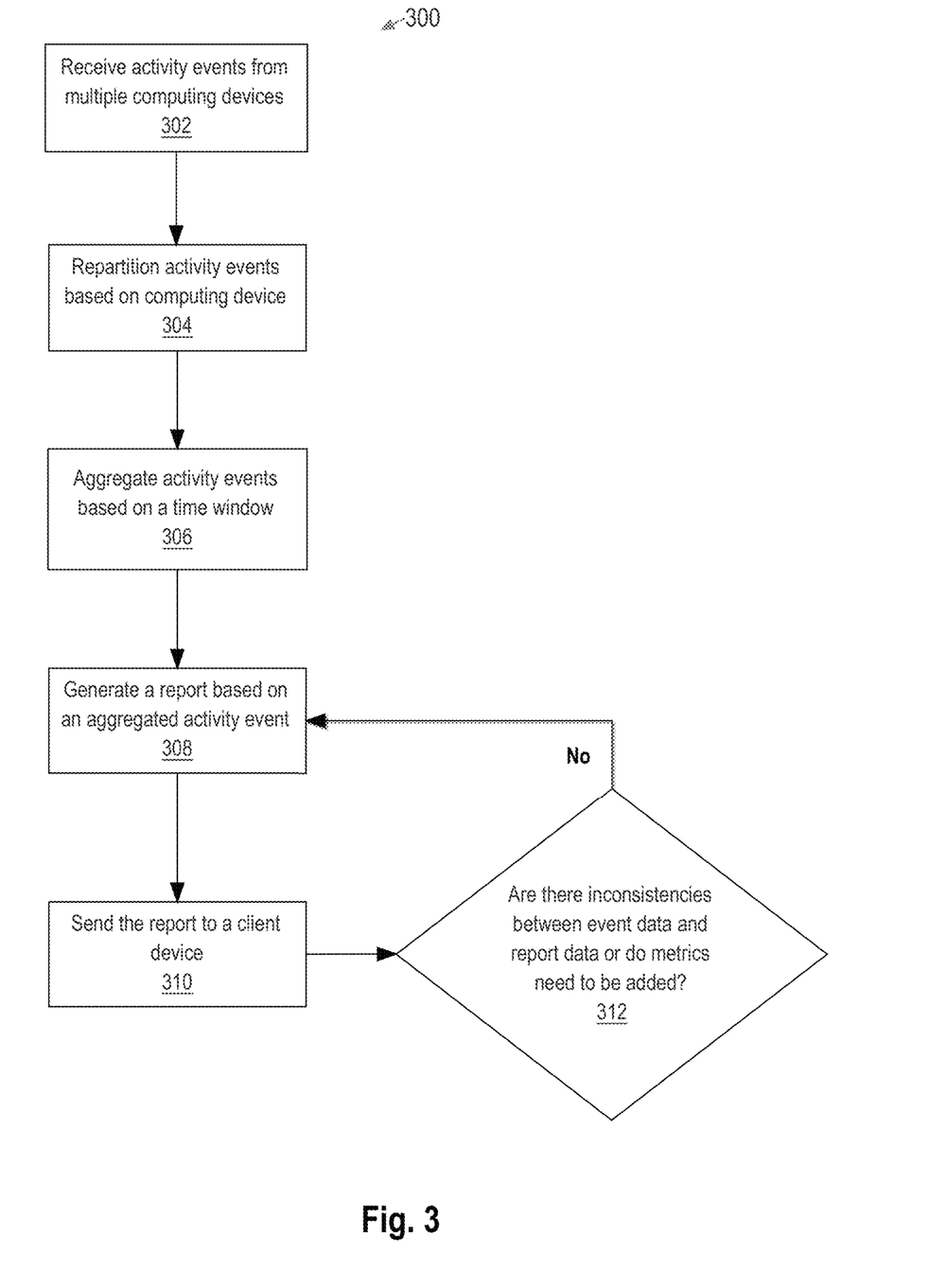
FIG. 3 is a flow diagram that depicts an example process for implementing and presenting real time analytics, in an embodiment.

FIG. 3 is a flow diagram that depicts a process 300 for enhanced data analytics in near real-time, in an embodiment.

At block 302, multiple activity events are generated at multiple computing devices (e.g., including computing device 102) and received from those computing devices. Block 302 may involve real-time event processing system 106 receiving the activity events directly or indirectly through another device in system 100 (not shown) that is behind network 104 and is communicatively coupled to event processing systems 106 and 110. Such another device receives the activity events and forwards the activity events to event processing systems 106 and 110, which processes the activity events according to their respective workflows. For example, initially, all activity events generated by all computing devices may be stored in a single log. Activity events from the single log are continuously fed into event processing systems 106 and 110.

At block 304, real-time event processing system 106 repartitions (or divides) activity events based on user or client device. Thus, activity events generated by the same computing device (e.g., computing device 102) (or associated with the same user) are sent to the same downstream process. Activity events received from another computing device/user may be sent to a different downstream process (which may be executing on a different downstream computing device than the one executing the first downstream process). In this way, regardless of which server device receives an event, the same downstream process will process all events associated with a particular user session.

Repartitioning may involve any approach for dividing activity events based on user/client device. For example, each activity event includes a user/member identifier and there are ten different servers or processes, each assigned to a different set of activity events. A repartitioning process may perform a modulo operation that computes a remainder given an input. For example, the modulo operation takes a user ID as input and calculates, based on the value 10, a remainder and uses that remainder to assign the corresponding activity event to one of the ten downstream processes associated with that remainder value.

In one embodiment, real-time event processing system 106 comprises a plurality of servers that includes distinct sets of servers, some tasked with repartitioning the events and others tasked with aggregation of partitioned sets of events. The processing pipeline may comprise more than two processing phases.

Offline event processing system 110 implements a data pipeline to process the same set of activity events that real-time event processing system 106 process. One or more servers behind network 104 may duplicate an activity event from a computing device and send the duplicates to both event processing systems 106 and 110. Alternatively, a computing device (e.g., computing device 102) may send the duplicate sets of activity events to event processing systems 106 and 110. Offline event processing system 110 implements jobs that run daily to generate and send certain event data to offline components of database 108, such as offline tables used for storage. An offline table stores data that has been pushed from offline processing, such as Hadoop, while a real-time table sources its data from online processing, such as Kafka. These two tables are disjoint and can contain the same data. If an offline table and a real-time table have the same name, then, when a query broker receives a query, the query broker rewrites the query into two queries, one for the offline table and one for the real-time table.

At block 306, real-time event processing system 106 aggregates a set of repartitioned events based on a timeframe and generates an aggregated event. For example, activity events of a particular type, generated by a particular computing device, and pertaining to the last two minutes are aggregated (or combined) to create an aggregated event.

An aggregated event may indicate the type of activity (e.g., a progress view event), a start time associated with the activity (which may be determined based on the earliest timestamped activity event from which the aggregated event was generated), an end time associated with the activity (which may be determined based on the latest timestamped activity event from which the aggregated event was generated), a time duration indicating how long the activity of this aggregated event lasted (which may be determined by determining a difference between the start time from the end time), an account indicator, a client indicator, and/or a user indicator. Each aggregated event is sent to database 108, where data used for near-time downloadable reports with low latency and scalable formats of analytics of system 100 is stored. For example, database 108 receives aggregated events from real-time event processing system 106 and aggregated data from offline event processing system 112.

Some of the data from offline event processing system 112 may overlap with data from real-time event processing system 106. For example, if database 108 maintains the last 36 hours of event data from real-time event processing system 106 and maintains the last year's worth of event data (where the earliest events are from 24 hours prior to the current time) from offline event processing system 112, then database 108 stores about 12 hours of duplicated information. However, if real-time event processing system 106 fails, then database 108 may still provide (for requested reports) data that is current up to about 24 hours prior to the current time.

Different types of activity events may be processed differently by different jobs executing in real-time event processing system 106. For example, a first (e.g., Samza) job repartitions view progress events (VPEs) and generates a repartitioned view progress event (rVPE) for each VPE that the first job consumes. A second job identifies rVPEs associated with the same computing device and spanning a particular time window (e.g., a 2-minute window), aggregates those rVPEs to generate a single report event, and causes the report event to be stored in database 108.

For completion events, a third job consumes a completion event (CE), generates a report event immediately, and causes the report event to be stored in database 108.

For page view events, a fourth job consumes page view events, repartitions based on computing device (which may be indicated by a profile ID or a user ID), then fires (or creates) a new repartitioned page view event. A fifth job consumes repartitioned page view events, implements sessionization logic, and fires a report event. The sessionization logic implemented by the fifth job may indicate that a new session will be created when a user has greater than a certain period of time (e.g., 30 minutes) of inactivity or has continuous activity over 24 hours. The certain period of time may be reset when the window traverses midnight.

Thus, a report event is an event that may be associated with one or a few of multiple types of "upstream" events. For example, real-time event processing system 106 generates a first type of report event when aggregating repartitioned view progress events, a second type of report event when receiving a completion event, a third type of report event when receiving a page view event. Report events of all types may be stored in database 108, from which activity reports are generated. The following are example data items within a report event (and corresponding fields or columns of the database): enterprise account ID, enterprise profile ID (or user ID), group ID (a user may belong to multiple groups), a start timestamp, an end timestamp, media item ID, course ID (if the media item belongs to a course), content type, metric type ID (e.g., viewing record, completed record, login record), a duration (applicable for viewing records), and a device type (e.g., Web, mobile app).

In an embodiment, database 108 comprises various offline and online components with different retention periods that enable availability of data from event processing systems 106 and 110. For example, online components of database 108 may allow data to be retained for multiple days while offline components of database 108 may allow data to be retained for multiple years.

Offline event processing system 110 includes intermediate storage, such as a distributed file system, an example of which is Hadoop Distributed File System (or HDFS). Offline event processing system 110 also includes one or more jobs that execute regularly (e.g., daily) that perform similar operations as the jobs of real-time event processing system 106 (described above). Thus, offline event processing system 110 also generates report events and stores those events in database 108.

Report and Analytic Generation

At block 308, a report is generated based on report events. The report may be a downloadable file comprising various metrics pertaining to users/members of an organization performing actions, which are reflected in different downstream report events. For example, a report may comprise information pertaining to users that started viewing but did not complete the viewing of a particular media item. Such a report may involve retrieving all report events of the viewing type and pertaining to the particular media item, grouping the report events by user, and then determining whether each user is associated with a report event of the completed type.

Thus, in an embodiment, system 100 generates reports and analytics containing near-time data expressed in metrics. The metrics are based on data stored in database 108. The reports and analytics may be generated automatically and/or in response to individual requests. A report/analytics generation request may be received through a web interface 112 provided by system 100. The web interface 112 interacts with API 114 that is communicatively coupled to database 108. Web interface 112 sends application-level requests to API 114, which translates the application-level requests into database requests that database 108 can process. API 114 may include not only data retrieval operations but also aggregation operations and comparison operations.

An example application-level request may indicate an account identifier, a metric type, and a time range. For example, the request may ask for the number of users of an enterprise that completed a particular video course in the last four weeks. Thus, the request indicates an account of the enterprise, a metric type of completed, and a time range of the last four weeks. API 114 translates the request into a database request that database 108 can process. The database request includes an account identifier, a metric type identifier, and the time range. All report events that satisfy these three criteria are retrieved and aggregated to generate a total number of such report events.

As another example, an application-level request may ask for the number of users in a particular group of an enterprise that have watched at least half of a particular video. This request indicates an account of the enterprise, a metric type of progress viewing, a media item ID of the particular video, and a filter that indicates greater or equal than 50% completion of the particular video. API 114 translates the request into a database request to retrieve report events of the specified metric type and then aggregates the report events by user to generate a total viewing time that each user has viewed the particular video and compares the total viewing time for each user with a known length of the particular video. If the total viewing time is greater than or equal to 50% of the length of the particular video, then a count indicating the requesting number of users is incremented. This comparison and possible incrementing is made for each user indicated in the retrieved report events.

Types of Metrics

There are multiple metrics used for activity events associated with media items within a network. These metrics include:

Number of seconds/minutes of a video viewed: this metric may be based on the activities of a single user or a group of users viewing a particular media item. The group of users may be a specified group or a group that is defined by one or more criteria, such as job title, pre-defined team membership within an enterprise, or skills.

Number of seconds/minutes/hours of a course completed: this metric may be based on a single user or a group of users viewing a media item with respect to a group of media items (or course) to which the media item belongs. For example, a metric based on a user viewing three media items within a course may indicate N minutes or N % of the course (to which the media items belong) completed.

Number of videos watched until completion: this metric may be based on the activities of a single user or a group of users viewing one or more media items until completion or until a predetermined threshold of the media items have been viewed.

Number of courses watched until completion: this metric may be based a single user or a group of users viewing all media items within a course until completion or until a predetermined threshold. For example, a user may view multiple media items among various courses resulting in completed viewings of one or more entire courses that is represented in the metric.

Number of user sessions: this metric may be based on the interactions between a content distribution network and a single user or a group of users. For example, a single user session may account for the duration from the user logging into the content distribution network until the user logging out or the session expiring. The total number of user sessions is represented in the metric.

Time of a learning path viewed: this metric may be based on viewing of a compiled playlist of media items pertaining to a learning path. A learning path comprises a series or videos and/or courses that correspond to a specific topic or career path. For example, the metric may indicate that a user viewed ten hours of media items of a learning path.

Amount of a learning path completed: this metric may be based on viewing one or more media items within a compiled playlist pertaining to a learning path. For example, the metric may indicate that a user viewed 65% of the content relating to a learning path or that a user viewed six out of nine courses in a learning path.

Overall number of videos viewed: this metric indicates an overall number of media items viewed by a particular user or group of users during a particular time period or for all time.

Overall number of courses viewed: this metric indicates an overall number of courses (or specified groups of media items) viewed by a user or group of users over a particular period of time or for all time.

Overall number of courses completed: this metric indicates an overall number of courses (or specified group of content items) viewed to a completion by a user or group of users over a particular period of time or for all time.

At block 310, the generated report is sent to an automated process that determines whether there are inconsistencies between the event data and the data within the report and, optionally, whether an additional metric needs to be added to the report. If upon the analysis the process determines that event data in the report is inconsistent and/or metrics need to be added, then the process may specify a start and end date of a timeframe necessary to add and/or re-process metric data. The snapshots of database 108 within the timeframe are maintained by non-real-time server 110 and the snapshots are computed by workflows associated with non-real-time server 110 resulting in the segments of database 108 being generated based on the specified timeframe.

In one embodiment, the generated report is presented, via a graphical user interface, to an administrator or customer associated with the requesting computing device. When there is an error or inconsistency within the data reflected in the report, or a new metric needs to be added to the report, then a backfill and recovery architecture will correct the error in the workflows and reflect the corrections in a new downloadable report via the method described further herein.

Example Process

Figure 4:
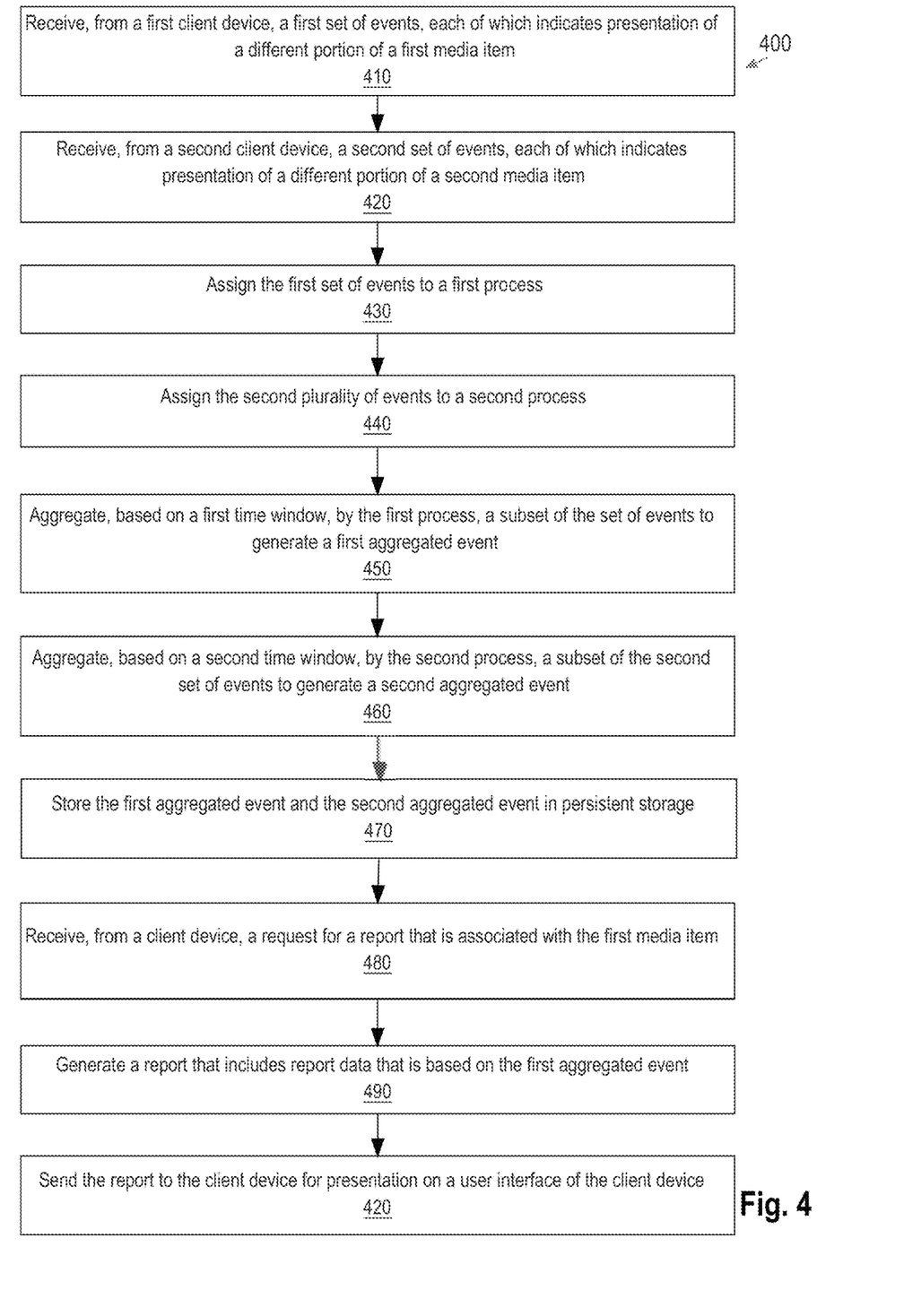
FIG. 4 is a flow diagram that depicts an example process for processing real-time events and generating a report based on the processing, in an embodiment.

FIG. 4 is a flow diagram that depicts an example process 400 for processing client-generated events, in an embodiment.

At block 410, a first set of activity events is received from a first client device. The first set of events may be received over network 104 from computing device 102. Each activity event indicates presentation of a different portion of a first media item.

At block 420, a second set of activity events is received from a second client device. The second set of events may be received over network 104 from another computing device (not depicted). Each activity event indicates presentation of a different portion of a second media item.

At block 430, the first set of events is assigned to a first computing process of real-time event processing system 106. Block 430 corresponds to repartitioning based on client device or user ID so that the same process or device aggregates all applicable activity events generated by that client device or associated with that user.

At block 440, the second set of events is assigned to a second computing process of real-time event processing system 106. Thus, block 440 is similar to block 430, but the second computing process may be different than the first computing process.

At block 450, the first computing process aggregates, based on a first time window, event data that is based on a subset of the first set of events to generate a first aggregated event. Block 450 may be performed multiple times but with respect to different, non-overlapping time windows.

At block 460, the second computing process aggregates, based on a second time window, event data that is based on a subset of the second set of events to generate a second aggregated event that is different than the first aggregated event. The second time window may be the same in magnitude as the first time window but may correspond to a different date and/or time within a day than the first time window. Again, block 460 may be performed multiple times but with respect to different, non-overlapping time windows.

At block 470, the first aggregated event and the second aggregated event are stored in persistent storage. Block 470 may be performed by real-time event processing system 106.

At block 480, a request for a report that is associated with the first media item is received from a third client device. Block 480 may be performed by web interface 112.

At block 490, in response to receiving the request, the first aggregated event is retrieved from the persistent storage and a report that includes report data that is based on the first aggregated event is generated. Block 490 may be performed by API 114 and, optionally, web interface 112.

At block 495, the report to be sent to the third client device for presentation on a user interface of the third client device.

In an embodiment, a request for a report indicates a time range that is not covered entirely by the report events generated by real-time event processing system 106 or the report events generated by offline event processing system 110. For example, report events generated by real-time event processing system 106 are stored in database 108 for the last two days while report events generated by offline event processing system 110 are stored in database 108 for two years, but does not include the last 24 hours. A request for a report indicates current data for the last week. In response, API 114 retrieves (1) report events generated by real-time event processing system 106 for the last two days and (2)

report events generated by offline event processing system 110 for days three through seven. In an embodiment, report events generated by real-time event processing system 106 are aged out (i.e., deleted automatically) after a period of time (e.g., a week).

Some requests for reports may require reading a significant number of records from database 108. In an embodiment, API 114 generates multiple queries from a single query, each query requesting records corresponding to a subset of the requested time range (e.g., weekly) indicated in the original query (e.g., last three months). In another embodiment, data that is returned by API 114 is compressed so that less data is returned to web interface 112, which decompresses the data.

Backfilling and Recovery

Embodiments may be used herein by administrators of different organizations to download (e.g., csv) reports regarding online media consumption by members of their respective organization. The backend system for building reports comprises offline and online workflows that push data to database 108. Bugs in processing jobs may introduce, into the event data, errors that need to be corrected. A backfill and recovery architecture allows any errors to be corrected without any downtime. The architecture also helps in backfilling data for any new metrics that are built. In embodiment, the backfill and recovery architecture is implemented in an offline (e.g., Hadoop) workflow and may be part of offline event processing system 110.

Prior to this architecture, a manual-intensive process was implemented. Such a process includes a lot of manual configuration. For example, a job is identified, a determination of which data sources are input to the job, have the job generate intermediate output, re-configure the push job that pushes the processed data to the online data store, and then manually run the job.

In contrast, in the event of an error, the backfill and recovery architecture enables correction of any errors in the data by traversing back to any timeframe that activity events were processed. For example, it is determined that report events from a particular date are incorrect. A recovery workflow takes that particular date as input and reads the activity events that are timestamped with that particular date and causes the workflow(s) implemented by offline event processing system 110 to generate updated report events that are used to overwrite the previous report events (from that particular date) in database 108. Thus, the only user input that is required is a specified date, date range, or time range. All jobs in the offline workflow may be re-run during the recovery process, even ones that do not need any modification. In a related embodiment, in addition to time-related input, a user might specify which jobs not to run again. In this way, the recovery process will run faster. For example, if a job processing completion events is functioning properly, then the user might specify that job to exclude. Alternatively, the user might specify jobs that are not functioning properly and only those jobs will be re-run against the events corresponding to the specified time range.

In one embodiment, a recovery workflow comprising the daily aggregated event data based on a designated timeframe is configured to reprocess the daily aggregated event data which generates an amended output that is pushed to database 108 to overwrite incorrect data. The amended output may be portrayed in a second generated report.

In an embodiment, the recovery workflow can be used as a backfill workflow. For example, a new metric may be defined for which future reports or analytics based on the new metric may be created. A new job is created for offline event processing system 110, where the new job analyzes a different set of data within activity events and/or performs a different set of operations on activity events. The new job is executed when the backfill workflow is invoked and populates database 108. Web interface 112 and API 114 may be updated to allow users to select the new metric for presentation.

Automated Testing

In an embodiment, a verification and automated testing framework is established that saves developer time and reduces chances of error in manual testing. Prior approaches to testing were manual and dependent on watching video to generate the data and downloading the report. The new testing methodology breaks the existing architecture into smaller sub-components which can be tested individually. This has the advantage of being faster and more efficient than manual testing, scalable with any new reports and analytics that are added to the pipeline, and of having the ability to generate automated alerts for failures in the system.

Automated Testing: Live Test

In an embodiment, a test for real-time event processing system 106 involves testing the flow of data from real-time event processing system 106 to database 108. The test verifies that one or more jobs process an activity event correctly and that the one or more jobs output an event correctly. The output is consumed by a real-time component of database 108. A different test may be created per job that real-time event processing system 106 executes. The test fires an event that will be consumed by a particular job, waits a period of time (e.g., a few minutes or seconds) to have the corresponding data propagate in the pipeline, and then makes a query request to database 108 to check whether a new record is generated in the appropriate table. For example, a test involves transmitting a completed activity event to real-time event processing system 106. The test checks database 108 within the next few minutes to determine whether there is a report event that corresponds to that completed activity event exists in database 108.

Additionally, there may be different sets of test for different types of activity events. For example, one set of tests may test real-time event processing system 106 for view progress events, another set of tests may test system 106 for completion events, and another set of tests may test system 106 for page view events.

Automated Testing: Download Test

In an embodiment, a download test is used to test reports that are generated based on data stored in database 108. The download test involves (1) downloading a report (e.g., in the form of a csv file) by using web interface 112 to compose an application-level request and send the request to API 114, which formulates a query against database 108, (2) identifying values for each metric in the report, and (3) cross checking the values with values from an analytics endpoint. A download test ensures that the download endpoint is working correctly and that every metric is consistent across reports and analytics. The download endpoint and the analytics endpoint are different endpoints: one allows downloading a CSV file and the other returns a JSON format, such as an array of [milliseconds, metricValue].

In a related embodiment, web interface 112 and API 114 support generation of multiple types of reports, some of which share the same data (e.g., total time a video was viewed). In this scenario, a download test may involve comparing the shared data from different reports and determining whether the shared data matches.

For example, web interface 112 may support a user summary report and a user detailed report, where (1) the user summary report has a single row per user and indicates a total time that the corresponding user has viewed videos provided by a content delivery system and (2) the user detailed report is for an individual user and lists each video (provided by the content delivery system) that the user viewed and the amount of time viewing each of those videos. A download test would involve totaling the individual amounts of time indicated in the user detailed report for a particular user and comparing the total time for that particular user indicated in the user summary report. If there is a mismatch, then there may be an error in the aggregation logic of API 114.

Automated Testing: Online/Offline Verification Test

In an embodiment, a verification test is performed to ensure that the output of the online (or real-time) workflow (implemented in real-time event processing system 106) matches the output of the offline workflow (implemented in offline event processing system 110). The verification test be implemented by an offline job that runs regularly (e.g., daily) to compare both outputs. The verification test involves causing both workflows to read the same activity events and perform their respective operations with respect to those activity events which causes the generation of the report events. The verification test then involves comparing the report events from each workflow to determine if the report events from one workflow match the report events from the other workflow. Thus, while the verification test tests both online and offline workflows, the live test described previously only tests the online workflow. If the verification test fails, then an alert may be generated and transmitted immediately to one or more administrators of system 100.

In a related embodiment, a verification test compares report events from the online workflow with report events from the offline workflow, where the report events are based on activity events generated by client devices of actual users that are viewing media items presented by the content distribution system.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
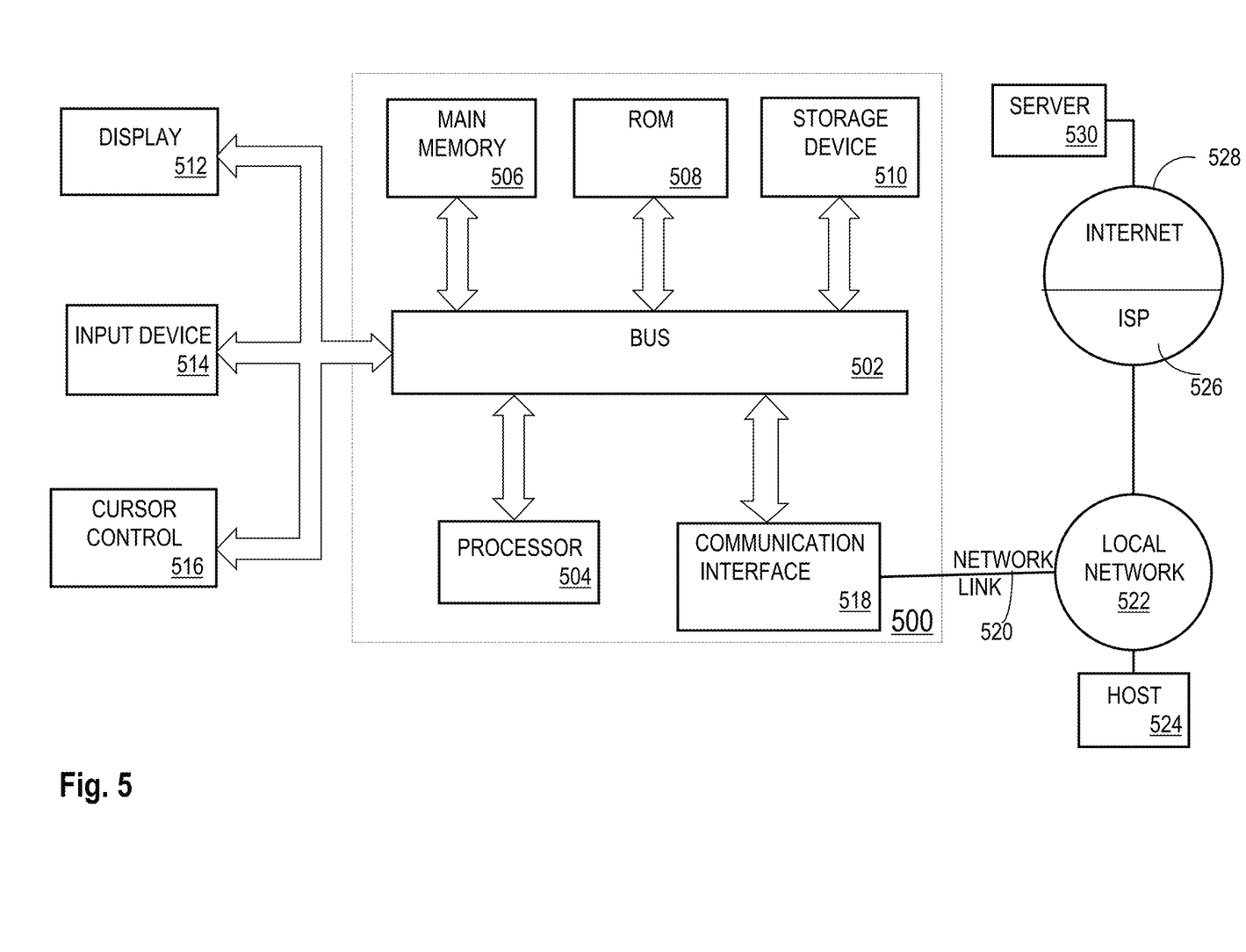
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, 0, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, at a computer system associated with a learning-based platform, from a first client device that is remote from the computer system, a first plurality of events that are generated by the first client device, each of which indicates presentation of a different portion of a first learning-based video item;
   receiving, at the computer system, from a second client device that is remote from the computer system, a second plurality of events, each of which indicates presentation of a different portion of a second learning-based video item;
   assigning the first plurality of events to a first process;
   assigning the second plurality of events to a second process that is different than the first process;
   aggregating, based on a first time window, by the first process, a subset of the first plurality of events to generate a first aggregated event;
   aggregating, based on a second time window, by the second process, a subset of the second plurality of events to generate a second aggregated event;
   storing the first aggregated event and the second aggregated event in persistent storage;
   receiving, from a third client device, a request for a report that is associated with the first learning-based video item;
   in response to receiving the request:
     retrieving the first aggregated event from the persistent storage;
     generating report data that is based on the first aggregated event;
     causing the report data to be sent to the third client device for presentation on a user interface of the third client device;
   wherein the method is performed by one or more computing devices.

2. The method of claim 1, wherein a system that comprises the first and second processes comprises a first workflow and a second workflow, wherein the first workflow is implemented by online components of the system and the second workflow is implemented by offline components of the system.

3. The method of claim 2, wherein the online components of the system retain data associated with the first aggregated event for a first period of time, and the offline components of the system are configured to retain data associated with the first aggregated event for a second period of time that is longer than the first period of time.

4. The method of claim 2, further comprising:
   executing a verification test for the first and second workflows, wherein executing the verification test comprises verifying whether first output generated by the first workflow matches second output generated by the second workflow.

5. The method of claim 2, further comprising:
  detecting one or more inconsistencies between the first workflow and the second workflow;
  after correcting the one or more inconsistencies, rerunning the first workflow or the second workflow against a set of activity events to generate a first set of report events;
  causing the first set of report events to replace, in the persistent storage, a second set of report events that was generated based on the set of activity events.

6. The method of claim 1, further comprising:
  generating analytics data based on the subset of the first plurality of events and the subset of the second plurality of events;
  generating particular report data based on the subset of the first plurality of events and the subset of the second plurality of events;
  verifying that the particular report data and the analytics data are consistent.

7. The method of claim 1, wherein generating the report data that is based on the first aggregated event further comprises:
  generating a first plurality of metrics comprising at least one of:
    a first time period indicating amount of interaction of the first client device with the first learning-based video item,
    a second time period indicating amount of interaction of a plurality of client devices with the first learning-based video item, or
    a determination whether presentation of the first learning-based video item is complete.

8. The method of claim 7, further comprising:
  in response to determining that a new metric is added, rerunning a first workflow or a second workflow against a set of activity events to generate a first set of report events;
  causing the set of activity events to be stored in the persistent storage.

9. A method comprising:
  receiving, from a plurality of computing devices, a plurality of activity events generated by the plurality of computing devices;
  processing, by a real-time event processing system of a computer system associated with a learning-based platform, the plurality of activity events to generate a first set of report events;
  processing, by an offline event processing system of the computer system, the plurality of activity events to generate a second set of report events;
  storing the first set of report events and the second set of report events in a database;
  receiving, from a client device, a request for a report;
  in response to receiving the request:
    retrieving a portion of the first set of report events and the second set of report events;
    generating a particular report that includes report data that is based on the portion;
    causing the particular report to be sent to the client device for presentation on a user interface of the client device;
  wherein the method is performed by one or more computing devices.

10. One or more storage media storing instructions which, when executed by one or more processors, cause:
  receiving, at a computer system, from a first client device that is relative to the computer system, a first plurality of events that are generated by the first client device, each of which indicates presentation of a different portion of a first learning-based video item;
  receiving, at the computer system, from a second client device that is remote relative to the computer system, a second plurality of events, each of which indicates presentation of a different portion of a second learning-based video item;
  assigning the first plurality of events to a first process;
  assigning the second plurality of events to a second process that is different than the first process;
  aggregating, based on a first time window, by the first process, a subset of the first plurality of events to generate a first aggregated event;
  aggregating, based on a second time window, by the second process, a subset of the second plurality of events to generate a second aggregated event;
  storing the first aggregated event and the second aggregated event in persistent storage;
  receiving, from a third client device, a request for a report that is associated with the first learning-based video item;
  in response to receiving the request:
    retrieving the first aggregated event from the persistent storage;
    generating report data that is based on the first aggregated event;
    causing the report data to be sent to the third client device for presentation on a user interface of the third client device.

11. The one or more storage media of claim 10, wherein a system that comprises the first and second processes comprises a first workflow and a second workflow, wherein the first workflow is implemented by online components of the system and the second workflow is implemented by offline components of the system.

12. The one or more storage media of claim 11, wherein the online components of the system retain data associated with the first aggregated event for a first period of time, and the offline components of the system are configured to retain data associated with the first aggregated event for a second period of time that is longer than the first period of time.

13. The one or more storage media of claim 11, wherein the instructions, when executed by the one or more processors, further cause:
  executing a verification test for the first and second workflows, wherein executing the verification test comprises verifying whether first output generated by the first workflow matches second output generated by the second workflow.

14. The one or more storage media of claim 11, wherein the instructions, when executed by the one or more processors, further cause:
  detecting one or more inconsistencies between the first workflow and the second workflow;
  after correcting the one or more inconsistencies, rerunning the first workflow or the second workflow against a set of activity events to generate a first set of report events;
  causing the first set of report events to replace, in the persistent storage, a second set of report events that was generated based on the set of activity events.

15. The one or more storage media of claim 10, wherein the instructions, when executed by the one or more processors, further cause:

generating analytics data based on the subset of the plurality of events and the subset of the second plurality of events;

generating particular report data based on the subset of the first plurality of events and the subset of the second plurality of events;

verifying that the particular report data and the analytics data are consistent.

16. The one or more storage media of claim 10, wherein generating the report data that is based on the first aggregated event further comprises:

generating a first plurality of metrics comprising at least one of:
- a first time period indicating amount of interaction of the first client device with the first learning-based video item,
- a second time period indicating amount of interaction of a plurality of client devices with the first learning-based video item, or
- a determination whether presentation of the first learning-based video item is complete.

17. The one or more storage media of claim 16, wherein the instructions, when executed by the one or more processors, further cause:

in response to determining that a new metric is added, rerunning a first workflow or a second workflow against a set of activity events to generate a first set of report events;

causing the set of activity events to be stored in the persistent storage.

* * * * *